(12) United States Patent
Kalluri et al.

(10) Patent No.: US 12,074,526 B2
(45) Date of Patent: Aug. 27, 2024

(54) HOLDUP ENERGY ARRANGEMENTS

(71) Applicant: Hamilton Sundstrand Corporation, Charlotte, NC (US)

(72) Inventors: Nageswara Rao Kalluri, Bangalore (IN); Sridhar Katakam, Bangalore (IN); Surendra Somasekhar Valleru, Bangalore (IN); Rajkumar Perumal, Bangalore (IN); Pravinsharma Kaliyannan Eswaran, Bangalore (IN)

(73) Assignee: Hamilton Sundstrand Corporation, Charlotte, NC (US)

( * ) Notice: Subject to any disclaimer, the term of this patent is extended or adjusted under 35 U.S.C. 154(b) by 147 days.

(21) Appl. No.: 17/885,157

(22) Filed: Aug. 10, 2022

(65) Prior Publication Data
US 2023/0063094 A1    Mar. 2, 2023

(30) Foreign Application Priority Data

Aug. 26, 2021   (IN) .............................. 202141038686

(51) Int. Cl.
*H02M 3/335*   (2006.01)
*H02M 5/458*   (2006.01)
*H02P 27/08*   (2006.01)

(52) U.S. Cl.
CPC ... *H02M 3/33584* (2013.01); *H02M 3/33515* (2013.01); *H02M 5/4585* (2013.01); *H02P 27/08* (2013.01)

(58) Field of Classification Search
CPC ......... H02M 3/33584; H02M 3/33515; H02M 5/4585; H02M 1/0006; H02M 1/0096; H02M 5/458; H02P 27/08; H02P 29/024; H02P 3/02

USPC .................................................. 318/504, 494
See application file for complete search history.

(56) References Cited

U.S. PATENT DOCUMENTS

| | | | |
|---|---|---|---|
| 4,593,213 A | 6/1986 | Vesce et al. | |
| 8,472,211 B2 | 6/2013 | Clemo et al. | |
| 9,954,426 B2* | 4/2018 | Kuroki | H02M 1/32 |
| 10,148,201 B2* | 12/2018 | Yoshida | H02P 3/18 |

(Continued)

FOREIGN PATENT DOCUMENTS

CN        103069067 A        4/2013

OTHER PUBLICATIONS

Extended European Search Report issued, of the European Patent Office, mailed on Jan. 20, 2023, in corresponding European Patent Application No. 22192096.0.

*Primary Examiner* — David Luo (57) ABSTRACT

A holdup energy arrangement can include a motor control module configured to connect to motor power electronics to operate an inverter to control a motor. The motor control module can operate at a lower voltage than the motor power electronics. The arrangement can include a power supply operatively connected to the motor control module and configured to provide power the motor control module and a converter operatively connected to the power supply and configured to be electrically connected to a DC link capacitor of the motor power electronics. The arrangement can also include a logic control module configured to control the converter to selectively allow energy to flow from the DC link capacitor, through the converter, and to the power supply to provide holdup energy to the power supply with energy from the DC link capacitor.

20 Claims, 2 Drawing Sheets

(56) References Cited

U.S. PATENT DOCUMENTS 10,566,923 B2 * 2/2020 Kuroki .................... H02P 27/08
10,749,428 B1 8/2020 Sengodan

* cited by examiner

HOLDUP ENERGY ARRANGEMENTS

CROSS-REFERENCE TO RELATED APPLICATION

This application claims the benefit of India Provisional Patent Application No. 202141038686, filed Aug. 26, 2021, the entire contents of which is being incorporated herein by reference in its entirety.

FIELD

This disclosure relates to holdup energy arrangements, e.g., for aircraft circuitry.

BACKGROUND

In aerospace electronic Line Replaceable Units (LRU) or other components, e.g., motor drive electronics, providing holdup energy for control and monitoring functions which are being driven by low voltage input power, normally with a 28V DC input, is a mandatory requirement to satisfy functional repeatability, start operating from a known state after power up and store specific data before power down, for example.

In conventional architectures, the holdup circuit includes a separate dedicated holdup capacitor, current limit resistors, and switches which occupy space on the control section of the LRU. These components not only create additional complexities for the operation, but also degrade the reliability of the overall holdup solution with an additional cost and weight.

Such conventional methods and systems have generally been considered satisfactory for their intended purpose. However, there is still a need in the art for improved holdup arrangement. The present disclosure provides a solution for this need.

SUMMARY

A holdup energy arrangement can include a motor control module configured to connect to motor power electronics to operate an inverter to control a motor. The motor control module can operate at a lower voltage than the motor power electronics. The arrangement can include a power supply operatively connected to the motor control module and configured to provide power the motor control module and a converter operatively connected to the power supply and configured to be electrically connected to a DC link capacitor of the motor power electronics. The arrangement can also include a logic control module configured to control the converter to selectively allow energy to flow from the DC link capacitor, through the converter, and to the power supply to provide holdup energy to the power supply with energy from the DC link capacitor.

The arrangement can further include a supply voltage sensor disposed in the power supply and configured to determine a supply line voltage between a first supply line and a second supply line. The logic control module can be operatively connected to the supply voltage sensor to receive signals therefrom.

The logic control module can be configured to operate the converter to allow energy to flow from the DC link capacitor, through the converter, and to the power supply when the supply line voltage is below or decreases below an undervoltage threshold. The logic control module can be configured to operate the converter for a fixed period of time based on a timer module to provide holdup power for a fixed time period.

In certain embodiments, the converter can be a bidirectional converter. The logic control module can be configured to allow energy flow to the DC link capacitor from the power supply to charge the DC link capacitor. The logic control module can be configured to receive voltage signals from a DC link voltage sensor in electrical communication with the DC link capacitor to sense a voltage of the DC link capacitor.

The converter can have a transformer configured to transform a high motor electronics voltage to a lower power supply voltage (e.g., and vice versa), a power supply side transistor configured to operate as a switch or a diode, and a motor electronics side transistor configured to operate as a switch or a diode. The logic control module can be operatively connected to the power supply side transistor and the motor electronics side transistor to control a respective state thereof.

In certain embodiments, the logic control module can operate in one or more modes. In a holdup energy supply mode, for example, the logic control module can be configured to provide a pulse width modulation (PWM) control to the power supply side transistor, and the motor electronics side transistor is allowed to act as a diode such that energy flows from the DC link capacitor, through the converter, to the power supply. In a DC link energy supply mode, for example, the logic control module can be configured to provide a pulse width modulation (PWM) control to the motor electronics side transistor, and the power supply side transistor is allowed to act as a diode such that energy flows from the power supply, through the converter, to the DC link capacitor.

In certain embodiments, the logic control module can be operatively connected to a first buffer and the timer module. The timer module can be connected to a second buffer. A PWM module can be connected to the first buffer and the second buffer. An output of the first buffer can be connected to the motor electronics side transistor to control a state of the motor electronics side transistor. An output of the second buffer can be connected to the power supply side transistor to control a state of the power supply side transistor.

In accordance with at least one aspect of this disclosure, a motor drive electrical system can include motor power electronics comprising a rectifier for converting input alternating current (AC) into direct current (DC), a first line and a second line connected to the rectifier, a DC link capacitor disposed between the first line and the second line, and an inverter connected to the first line and the second line and configured to connect to a motor. The system can include a holdup energy arrangement, e.g., as disclosed herein (e.g., as described above).

In accordance with at least one aspect of this disclosure, a method can include providing holdup power to a power supply that operates at a first voltage by flowing energy from a DC link capacitor in motor power electronics that operates at a second voltage higher than the first voltage to the power supply. In certain embodiments, flowing energy from a DC link capacitor to the power supply can include causing energy to transfer from the DC link capacitor to the power supply when the power supply voltage drops below an undervoltage threshold. The method can include any other suitable method(s) and/or portions thereof, and/or can be stored on a non-transitory computer readable medium in the form of computer executable instructions.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
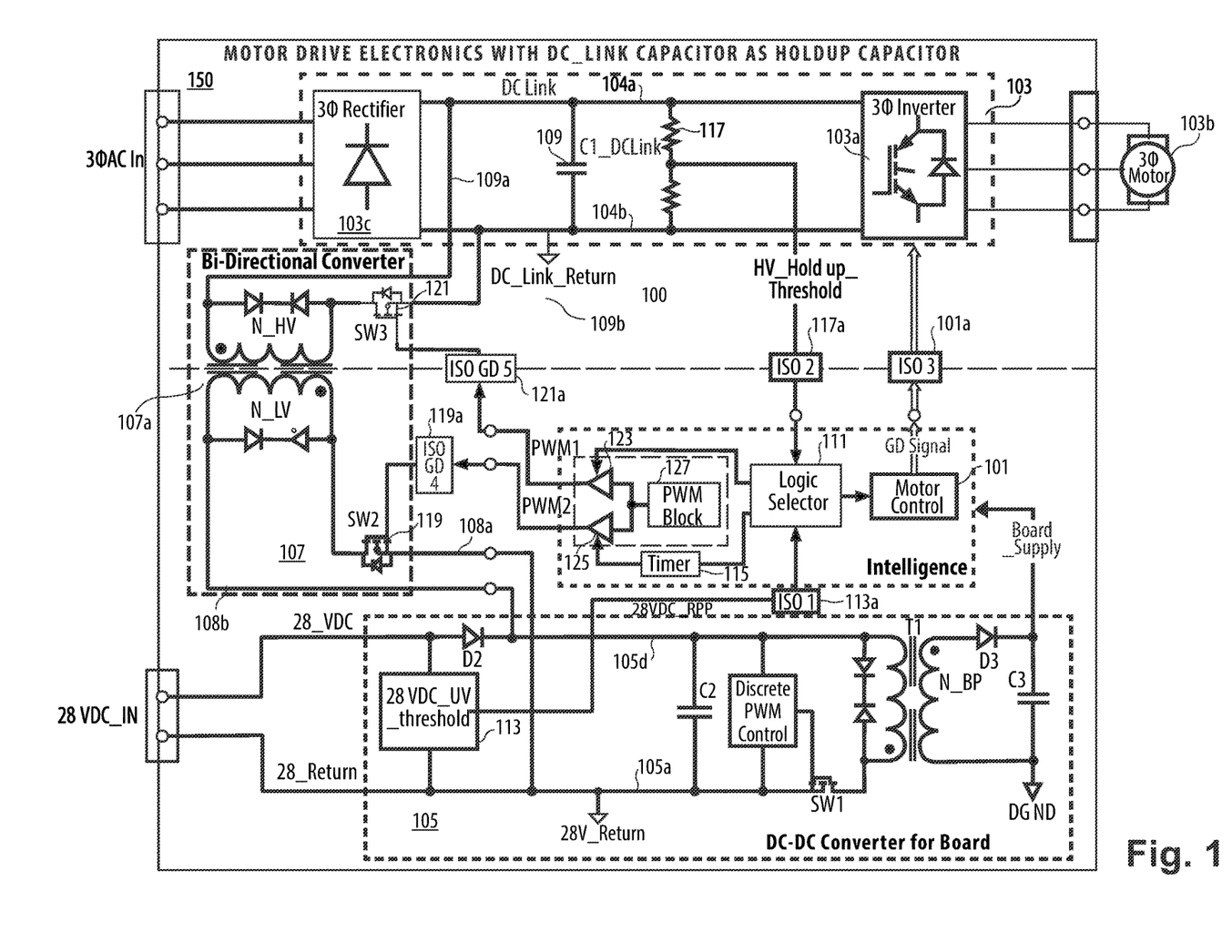
FIG. 1 is a schematic diagram of an embodiment of a holdup energy arrangement in accordance with this disclosure, shown connected to motor power electronics.
Figure 2:
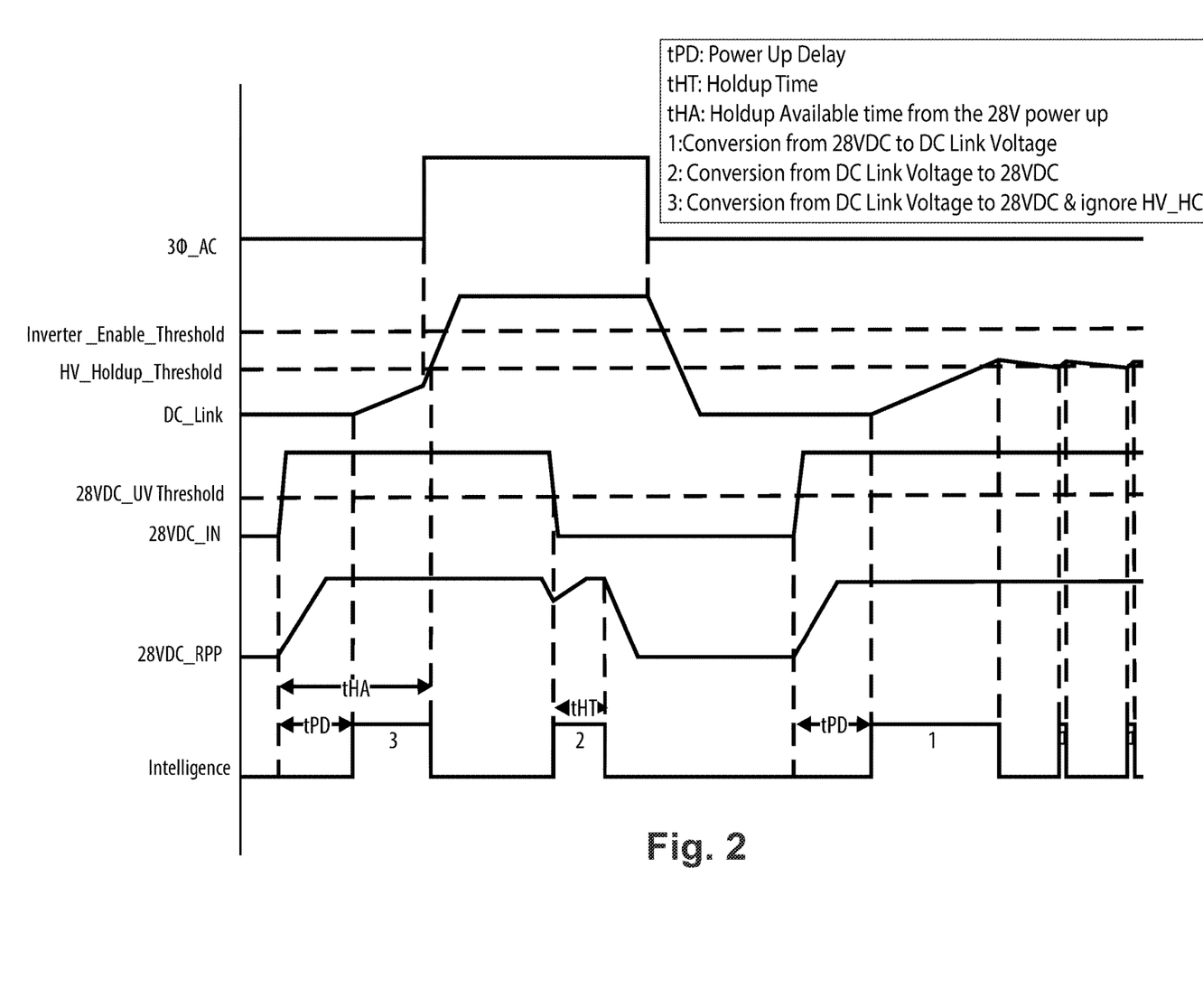
FIG. 2 is a timing diagram of detections, power sources, and conversions between the DC link and the power supply.

Reference will now be made to the drawings wherein like reference numerals identify similar structural features or aspects of the subject disclosure. For purposes of explanation and illustration, and not limitation, an illustrative view of an embodiment of a holdup energy arrangement in accordance with the disclosure is shown in FIG. 1 and is designated generally by reference character 100. Other embodiments and/or aspects of this disclosure are shown in FIG. 2. Certain embodiments described herein can be used to provide holdup power to low voltage electronics without a dedicated holdup capacitor or other circuit.

Referring to FIG. 1, a holdup energy arrangement 100 can include a motor control module 101 configured to connect to motor power electronics 103 (e.g., a high voltage three phase AC-DC-AC converter via an isolator 101a) to operate an inverter 103a to control a motor 103b. The motor control module 101 can operate at a lower voltage (e.g., at or less than 28V) than the motor power electronics 103. The arrangement 100 can include a power supply 105 operatively connected to the motor control module 101 and configured to provide power the motor control module 101.

The arrangement 100 can include a converter 107 operatively connected to the power supply 105 and configured to be electrically connected to a DC link capacitor 109 of the motor power electronics 103. The arrangement 100 can also include a logic control module 111 configured to control the converter 107 to selectively allow energy to flow from the DC link capacitor 109 (e.g., via lines 109a, 109b), through the converter 107, and to the power supply 105 (e.g., via lines 108a, 108b) to provide holdup energy to the power supply 105 with energy from the DC link capacitor 109.

The arrangement 100 can further include a supply voltage sensor 113 disposed in the power supply 105 and configured to determine a supply line voltage between a first supply line 105a and a second supply line 105b. The logic control module 111 can be operatively connected to the supply voltage sensor 113 (e.g., via an isolator 113a) to receive signals therefrom.

The logic control module 111 can be configured to operate the converter 107 to allow energy to flow from the DC link capacitor 109, through the converter 107, and to the power supply 105 when the supply line voltage is below or decreases below (after being above) an undervoltage threshold (e.g., less than about 27V, e.g., about 16V or less than 16V). The logic control module 111 can be configured to operate the converter 107 for a fixed period of time based on a timer module 115 to provide holdup power for a fixed time period. Any other suitable type of control (e.g., based on any suitable timing or logic) is contemplated herein.

In certain embodiments, the converter 107 can be a bidirectional converter (e.g., as shown). The logic control module 111 can be configured to allow energy flow to the DC link capacitor 109 from the power supply 105 to charge the DC link capacitor 109. The logic control module 111 can be configured to receive voltage signals from a DC link voltage sensor 117 (e.g., via isolator 117a) in electrical communication with the DC link capacitor 109 to sense a voltage of the DC link capacitor 109.

The converter 107 can include a transformer 107a configured to transform a high motor electronics voltage (e.g., hundreds of volts) to a lower power supply voltage (e.g., and vice versa). The converter 107 can include a power supply side transistor 119 configured to operate as a switch or a diode, and a motor electronics side transistor 121 configured to operate as a switch or a diode. The logic control module 111 can be operatively connected to the power supply side transistor 119 (e.g., via isolator 119a) and the motor electronics side transistor 121 (e.g., via isolator 121a) to control a respective state thereof.

In certain embodiments, the logic control module 111 can be operatively connected to a first buffer 123 and the timer module 115. The timer module 115 can be connected to a second buffer 125. A PWM module 127 can be connected to the first buffer 123 and the second buffer 125. An output of the first buffer 123 can be connected to the motor electronics side transistor 121 to control a state of the motor electronics side transistor 121. An output of the second buffer 125 can be connected to the power supply side transistor 119 to control a state of the power supply side transistor 119. Any other suitable control scheme, and any other suitable switch types or arrangement of switches is contemplated herein.

In certain embodiments, the logic control module 111 can operate in one or more modes. In a holdup energy supply mode, for example, the logic control module 111 can be configured to provide a pulse width modulation (PWM) control (PWM2 as shown in FIG. 1) to the power supply side transistor 119, and the motor electronics side transistor 121 can be allowed to act as a diode such that energy flows from the DC link capacitor 109, through the converter 107, to the power supply 105. In a DC link energy supply mode, for example, the logic control module 111 can be configured to provide a pulse width modulation (PWM) control (PWM1 as shown in FIG. 1) to the motor electronics side transistor 121, and the power supply side transistor 119 can be allowed to act as a diode such that energy flows from the power supply 105, through the converter 107, to the DC link capacitor 109. Any other suitable modes are contemplated herein, e.g., as disclosed hereinbelow. For example, the control module 111 can include an off mode where both transistors 119, 121 are in an off state so that there is no flow.

Any module disclosed hereinabove can include any suitable hardware and/or software module(s) configured to perform any suitable function (e.g., as described and/or otherwise).

In accordance with at least one aspect of this disclosure, a motor drive electrical system 150 can include motor power electronics 103 comprising a rectifier 103c for converting input alternating current (AC) into direct current (DC), a first line 104a and a second line 104b connected to the rectifier 103c, a DC link capacitor 109 disposed between the first line 104a and the second line 104b, and an inverter 103a connected to the first line 104a and the second line 104b and configured to connect to a motor 103b. The system 150 can include a holdup energy arrangement, e.g., arrangement 100 as disclosed herein (e.g., as described above).

In accordance with at least one aspect of this disclosure, a method can include providing holdup power to a power supply that operates at a first voltage by flowing energy from a DC link capacitor in motor power electronics that operates at a second voltage higher than the first voltage to the power supply. In certain embodiments, flowing energy from a DC link capacitor to the power supply can include causing energy to transfer from the DC link capacitor to the power supply when the power supply voltage drops below an undervoltage threshold. The method can include any other suitable method(s) and/or portions thereof, and/or can be stored on a non-transitory computer readable medium in the form of computer executable instructions.

In certain aircraft systems, a holdup circuit is used to provide power to critical 28V components when power is lost in a normal 28V system. Embodiments can include a logic selector (e.g., control module 111) that receives information to determine which state to operate the converter in. Embodiments can use timer to set a maximum time for pulling energy from DC link capacitor. The logic selector can work with a PWM block to control the switch on DC link side and the switch on 28V side to convert them between being a switch or a rectifier. In charging the DC link capacitor, the transistor 121 (also shown as SW3) can be rectifier and transistor 119 (also shown as SW2) can be a switch, and vice versa when drawing from the DC link capacitor. Embodiments can having the control module and related components in a single intelligence unit with the motor control module. However, these need not be in same unit as the motor control as shown. Any suitable disambiguation is contemplated.

Embodiments include an architecture that can utilize the DC link capacitor (C1_DC Link) presented in High Voltage (HV) side of a 3-Phase AC fed, Motor Drive Electronics (MDE), providing the holdup energy to 28 VDC Low voltage (LV) side when required without any delay. Embodiments can allow removal of the holdup capacitor and holdup circuit from conventional architectures. This removal saves significant space, cost, and complexity.

In embodiments, the logic control module in the motor drive electronics can monitor DC link voltage and 28 DC in supply continuously for different purposes. Embodiments can utilize the DC link capacitor, a bidirectional converter, and available HV and LV monitors, and can configure operation in such a way that the holdup energy is available when required by 28V LV circuit. Embodiments can be configured to operate in various modes, e.g., as shown in FIG. 2. In embodiments, the intelligence can be powered up from 28V DC (28 VDC_IN) source input, but can be configured to also power up from HV power.

Referring additionally to FIG. 2, the power supply 105 (also shown as DC-DC converter for board power supply) can convert the 28 VDC input in to Board_supply (with the help of switch SW1 and discrete PWM control, N_BP winding, D3, and C3) within the power up delay (tPD) duration which can be required for all the intelligence operation. Soon after the intelligence gets the power to operate, it can monitors the signals 28 VDC_UV_threshold (e.g., output by sensor 113 through ISO 1) and HV_Holdup_Threshold (e.g., output by sensor 117 through ISO 2) from DC link voltage. Based on these monitor conditions, the intelligence can enable/disable the bi-directional converter operation. When enabled, the bi-directional converter can operate in a particular direction to transfer the energy either from the power supply (e.g., line voltage 28 VDC_RPP) to the DC link (e.g., DC link voltage DC_Link), or from the DC link to the power supply. When disabled, the bi-directional converter does not transfer energy either side.

When none of the monitor signals are detected, the intelligence can enable the PWM2 (Pulse Width Modulated) signal (e.g., with fixed duty cycle and frequency) to operate the power switch SW2 through ISO GD4, and can disable PWM1 to disable power switch SW3 through ISO GD 5. These conditions can allow the bi-directional converter to transfer the energy from 28V_RPP to DC_Link. In certain embodiments, when PWM2 is high (e.g., Logic 1 or VCC), SW2 turns ON to provide a path for the current to flow from 28 VDC_RPP to N_LV of the T2 to 28V_Return. This current path stores the energy in to N_LV winding inductance. When PWM2 is low (Logic 0 or GND), SW2 turns OFF to stop the current flow. During SW2 OFF condition, stored energy from N_LV is magnetically transferred to N_HV winding of transformer 107*a* (also shown as T2) and charges the DC link capacitor 109 (also shown as C1_DClink) through body diode of SW3 switch. The bi-directional converter in this mode can utilize T2 (winding N_LV and winding N_HV), SW2, and body diode of SW3 to operate in Fly back mode to transfer the energy from 28 VDC_RPP to DC_Link.

The ON and OFF cycle of PWM2 signal can continue until HV_Holdup_Threshold detected (until the voltage is above a holdup threshold). Once detected, the logic control module can disable PWM2 to stop the energy transfer from 28V_RPP to DC_Link and bi-directional converter can be disabled. The intelligence continuously monitors the signals undetected to repeat the sequence to transfer energy from 28 VDC_RPP to DC_Link.

When 28 VDC_UV_threshold is detected (e.g., when voltage of the power supply input falls below a low voltage threshold) and/or when both monitors are detected at the same time, the logic control module can enable PWM1 (Pulse Width Modulated) signal (e.g., with fixed duty cycle and frequency) to operate the power switch SW3 through ISO GD5 and disables PWM2 to disable power switch SW2 through ISO GD 4. These conditions allow bi-directional converter to transfer the energy from the DC_Link to 28V_RPP. When PWM1 is high (Logic 1 or VCC), SW3 can turn ON to provide a path for the current to flow from DC_Link/C1_DC_link to N_HV of the T2 to DC_Link-_Return/C1_DC_link. This current path stores the energy in to N_HV winding inductance. When PWM1 is low (Logic 0 or GND), SW3 turns OFF to stop the current flow. During SW3 OFF condition, the stored energy from N_HV is magnetically transferred to N_LV winding of T2 and charges the capacitor C2/28 VDC_RPP rail voltage through body diode of the SW3 switch. The bi-directional converter can include of T2 (N_LV, N_HV), SW2, body diode of SW2. The bi-directional converter can utilize T2 (N_HV, N_LV), SW3, and the body diode of SW2 to operate in fly back mode to transfer the energy from DC_Link to 28 VDC_RPP. The ON and OFF cycle of PWM1 signal can continue for a duration of holdup time (tHT) set by the timer module 115. Once the duration is elapsed, the logic control module can disable the PWM1 to stop the energy transfer from DC_Link to 28V_RPP, and the bi-directional converter can be disabled.

Embodiments can include transformer windings N_LV and N_HV sized by considering worst case energy required, maximum DC_Link voltage, and maximum input the DC-DC converter for board power supply can handle so that the transformer will not get saturated. Embodiments can include a bidirectional fly-back converter designed to allow either direction of energy transfer. Embodiments can be configured to operate in a fly-back topology (which can act as limited current source) with discontinuous mode operation to reduce the time to transfer required energy. Embodiments can be configured to operate in an open loop control (fixed frequency and duty cycle), e.g., not meant to control the voltage, and do not require a critical loop stability controller. Embodiments can include a holdup voltage threshold on the DC_Link that can be less than minimum working voltage of the inverter operation to avoid any accidental turn ON of the inverter by the intelligence.

The embodiment shown in FIG. 1 was simulated and verified against different DC_Link and 28 VDC_IN input conditions to make sure the holdup energy is available to 28V DC-DC converter for board supply. Below, individual cases are presented that explain different scenarios (in an example 28V low voltage system) and how the bi-directional converter can ensure the holdup energy availability with the help of the logic control module (e.g., in the intelligence). FIG. 2 shows different sequences of events and timings related to these cases described below. Any other suitable sequence or reaction to difference events is contemplated herein.

Case 1: 28V available before 3-phase supply is available (Energy flow: 28 VDC_RPP to DC_Link).

During this condition, the logic module can enable the bidirectional converter based on the DC-link voltage monitor such that the 28V supply charges the DC link capacitor with a constant current to a voltage just below the inverter operating input voltage to remove the false turn ON of inverter function. Once the DC link voltage reaches the required voltage (based on the holdup energy required with the DC link capacitor value), the logic control module can disable the bi-directional converter. The purpose of this charging is to make sure holdup energy available to the critical functions in case of sudden loss of 28V supply.

Case 2: 28V shutting off with no 3-phase supply (Energy flow: DC_link to 28 VDC_RPP).

During this condition, the logic control module can enable the bidirectional converter based on the 28V voltage monitor such that the DC link voltage energy feeds back to the 28V rail with a constant current for a given period of time to support the holdup energy to the critical functions.

Case 3: 3-phase supply available before 28V available (no energy flow).

During this condition, the logic control module may not be powered up to take any actions to enable/disable the bidirectional converter to operate. By design, the converter would be in a disabled state. But the DC link voltage is fully charged to rectifier output and also available to feed hold up energy if required once the intelligence is powered up with 28V supply input.

Case 4: 3-phase supply available and 28V shutting off (Energy flow: DC_link to 28 VDC_RPP).

During this condition, the logic control module can enable the bidirectional converter based on the 28V voltage monitor such that the DC link voltage energy feeds back to 28V rail with a constant current for a given period of time to support the holdup energy to the critical functions.

Case 5: Both 28V and 3-phase supply are available at a same time (Energy flow: 28 VDC_RPP to DC_link).

During this condition, the logic control module can enable the bidirectional converter based on the DC-link voltage monitor such that the 28V supply will be used to charge the DC link capacitor if required with a constant current while the rectifier output charges DC link capacitor as well. Once the intelligence detects a proper voltage on the DC link voltage, it can disables the converter operation.

Case 6: Only 3-phase supply available (No energy flow).

During this condition, the logic control module may not be powered up to take any actions to enable/disable the bidirectional converter to operate. By design, the converter can be in a disabled state. But the DC link voltage is fully charged to rectifier output and also available to feed hold up energy if required upon the intelligence being powered up with 28V supply input.

Case 7: only 28V available (Energy flow: 28 VDC_RPP to DC_link).

During this condition, the logic control module can enable the bidirectional converter based on the DC-link voltage monitor such that the 28V supply charges the DC link capacitor with a constant current to a voltage just below the inverter operating input voltage to removing the false turn ON of inverter function. Once the DC link voltage reaches to the required voltage (e.g., based on the holdup energy required with DC link capacitor), the logic control module can disable the bi-directional converter. The purpose of this charging is to make sure holdup energy availability to the critical functions in case of sudden loss of 28V supply. If the 3-phase is not available for a long time, the converter can turn ON whenever HV_Threshold_Holdup voltage from the DC Link is reduced below a lower hysteresis voltage. This detection and conversion repeats if the conditions exist.

Case 8: Both 28V and 3-phase supply are off. No action is required during this condition as the intelligence is powered off.

Any other suitable circumstances and reactions thereto are contemplated herein (e.g., accounting for turning on the intelligence using three phase power. The logic control module can perform any other suitable function.

Embodiments are configured to utilize the DC link capacitor for 28V control and monitor holdup energy source in aerospace motor drive electronics applications. Conventional motor drive electronics driven from 28V input for control and monitor functions requires considerable amount of capacitance to support the holdup energy for critical functions during the power down condition. The energy requirement, type of dielectric material, environmental conditions and the capacitor package restrictions poses constrains on component selection, cost, single source and increase the complexity in the circuit design.

Traditionally, this holdup requirement is achievable by placing bulk capacitors on 28V DC power rails or on a specific derived voltage to store energy. To derive the required holdup energy to be stored in the capacitors, the required functional power during the power down, p in watts, and its duration, t in sec to be estimated as below.

$$E = p*t$$

The value of the capacitance, C in farads, is determined by the energy requirement, E in joules and voltage across the capacitor, V in volts, by.

$$E = \frac{1}{2}*C*v^2$$

From the above equation, doubling the voltage across capacitor, quadruples the energy storage and increasing the capacitance, increases the energy linearly. For a given energy storage requirement with higher voltage across the capacitor, the overall capacitance needed will be less. The capacitance value also affected by operating temperature, voltage and reliability requirements. Also the size/package and dielectric type of these capacitors limited by exposure to the mechanical shock, vibration and manufacturing & assembly limitations set by individual organizational guidelines. The increase in energy requirement poses a difficulty in component selection and operating voltages.

Aluminum Electrolytic, Tantalum and Ceramic types are few choices for the capacitor selection. The aluminum electrolytic capacitors have high energy density and low cost, but these capacitors are restricted to use in aerospace application due to the higher leakage current and limited operating temperature range. The Tantalum capacitors too have high energy density but these de-rates to 50% of capacitance at −55 degs, the size of the capacitor is less but are very costly. The capacitance of MLCC's capacitors will de-rate with temperature and holdup time will reduce over operational period of the LRU.

Embodiments, however, utilize the DC link capacitor presented in High Voltage side of the 3-Phase AC fed, Motor Drive Electronics, providing the holdup energy to 28 VDC Low voltage side when required without any delay. Embodiments remove the holdup capacitor and holdup circuit from conventional architecture. As presented above, embodiments save significant space, cost, weight, and complexity, and, moreover, removes the difficulties mentioned above. The DC Link capacitor is already available in the system and holdup implementation is free of cost. This can provide a reduction on PCB space as holdup capacitor and its associated circuit components are not required on 28V supply side. Also, the holdup energy requirement will be compliant irrespective of 28V supply line conditions, operating, and storage temperature conditions. Holdup time and energy can be increased easily without any component modifications if the higher level system demands. The transformer design of the 28V power converter for board power supply is not required to have an additional holdup winding and simplifies the transformer and fly-back converter design. No additional controller is necessarily required to control the bi-directional converter since the motor control can include an on-board intelligence which can act as a controller for converter (hosting motor control modules as well as logic control modules). Additionally, the voltage monitors (28V under voltage, DC link voltage) for bi-directional converter operation are already built in to conventional current architectures and can be used for the operation which reduces the cost, space, and component counts. Embodiments do not require a holdup capacitor on the 28V supply.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A holdup energy arrangement, comprising:
 a motor controller configured to connect to motor power electronics to operate an inverter to control a motor, wherein the motor controller is configured to operate at a lower voltage than the motor power electronics;
 a power supply operatively connected to the motor controller and configured to provide power to the motor controller;
 a converter operatively connected to the power supply and configured to be electrically connected to a DC link capacitor of the motor power electronics; and
 a logic controller configured to control the converter to selectively allow energy to flow from the DC link capacitor through the converter to the power supply to provide holdup energy to the power supply with energy from the DC link capacitor.

2. The arrangement of claim 1, further comprising a supply voltage sensor disposed in the power supply and configured to determine a supply line voltage between a first supply line and a second supply line, wherein the logic controller is operatively connected to the supply voltage sensor and is configured to receive signals therefrom.

3. The arrangement of claim 2, wherein the logic controller is configured to operate the converter to allow the energy to flow from the DC link capacitor through the converter to the power supply when the supply line voltage is below or decreases below an undervoltage threshold.

4. The arrangement of claim 3, wherein the logic controller is configured to operate the converter for a fixed period of time based on a timer to provide holdup power for a fixed time period.

5. The arrangement of claim 4, wherein;
 the converter is a bidirectional converter;
 the logic controller is configured to allow energy to flow to the DC link capacitor from the power supply to charge the DC link capacitor; and
 the logic controller is configured to receive voltage signals from a DC link voltage sensor in electrical communication with the DC link capacitor to sense a voltage of the DC link capacitor.

6. The arrangement of claim 5, wherein the converter includes:
 a transformer configured to transform a high motor electronics voltage to a lower power supply voltage;
 a power supply side transistor configured to operate as a switch or a diode; and
 a motor electronics side transistor configured to operate as a switch or a diode, wherein the logic controller is operatively connected to the power supply side transistor and the motor electronics side transistor and is configured to control respective states thereof.

7. The arrangement of claim 6, wherein, in a holdup energy supply mode, the logic controller is configured to provide a first pulse width modulation (PWM) control to the power supply side transistor and the motor electronics side transistor is allowed to act as a diode such that the energy flows from the DC link capacitor through the converter to the power supply.

8. The arrangement of claim 7, wherein, in a DC link energy supply mode, the logic controller is configured to provide a second PWM control to the motor electronics side transistor and the power supply side transistor is allowed to act as a diode such that the energy flows from the power supply through the converter to the DC link capacitor.

9. The arrangement of claim 8, wherein;
the logic controller is operatively connected to a first buffer and the timer;
the timer is connected to a second buffer;
a PWM module is connected to the first buffer and the second buffer;
an output of the first buffer is connected to the motor electronics side transistor to control the state of the motor electronics side transistor; and
an output of the second buffer is connected to the power supply side transistor to control the state of the power supply side transistor.

10. A motor drive electrical system, comprising:
motor power electronics comprising a rectifier for converting configured to convert input alternating current (AC) into direct current (DC), a first line and a second line connected to the rectifier, a DC link capacitor connected to the first line and the second line, and an inverter connected to the first line and the second line and configured to connect to a motor; and
a holdup energy arrangement comprising:
  a motor controller connected to the motor power electronics to operate the inverter to control the motor, wherein the motor controller is configured to operate at a lower voltage than the motor power electronics;
  a power supply operatively connected to the motor controller and configured to provide power to the motor controller;
  a converter operatively connected to the power supply and configured to be electrically connected to the DC link capacitor of the motor power electronics; and
  a logic controller configured to control the converter to selectively allow energy to flow from the DC link capacitor through the converter to the power supply to provide holdup energy to the power supply with energy from the DC link capacitor.

11. The system of claim 10, further comprising a supply voltage sensor disposed in the power supply and configured to determine a supply line voltage between a first supply line and a second supply line, wherein the logic controller is operatively connected to the supply voltage sensor and is configured to receive signals therefrom.

12. The system of claim 11, wherein the logic controller is configured to operate the converter to allow the energy to flow from the DC link capacitor through the converter to the power supply when the supply line voltage is below or decreases below an undervoltage threshold.

13. The system of claim 12, wherein the logic controller is configured to operate the converter for a fixed period of time based on a timer to provide holdup power for a fixed time period.

14. The system of claim 13, wherein:
the converter is a bidirectional converter;
the logic controller is configured to allow energy to flow to the DC link capacitor from the power supply to charge the DC link capacitor; and
the logic controller is configured to receive voltage signals from a DC link voltage sensor in electrical communication with the DC link capacitor to sense a voltage of the DC link capacitor.

15. The system of claim 14, wherein the converter includes:
a transformer configured to transform a high motor electronics voltage to a lower power supply voltage;
a power supply side transistor configured to operate as a switch or a diode; and
a motor electronics side transistor configured to operate as a switch or a diode, wherein the logic controller is operatively connected to the power supply side transistor and the motor electronics side transistor and is configured to control respective states thereof.

16. The system of claim 15, wherein, in a holdup energy supply mode, the logic controller is configured to provide a first pulse width modulation (PWM) control to the power supply side transistor and the motor electronics side transistor is allowed to act as a diode such that the energy flows from the DC link capacitor through the converter to the power supply.

17. The system of claim 16, wherein, in a DC link energy supply mode, the logic controller is configured to provide a second PWM control to the motor electronics side transistor and the power supply side transistor is allowed to act as a diode such that the energy flows from the power supply through the converter to the DC link capacitor.

18. The system of claim 17, wherein:
the logic controller is operatively connected to a first buffer and the timer;
the timer is connected to a second buffer;
a PWM module is connected to the first buffer and the second buffer;
an output of the first buffer is connected to the motor electronics side transistor to control the state of the motor electronics side transistor; and
an output of the second buffer is connected to the power supply side transistor to control the state of the power supply side transistor.

19. A method, comprising:
providing holdup power to a power supply that operates at a first voltage by flowing energy from a DC link capacitor in motor power electronics that operate at a second voltage higher than the first voltage to the power supply.

20. The method of claim 19, wherein flowing the energy from the DC link capacitor to the power supply includes causing the energy to transfer from the DC link capacitor to the power supply when the power supply voltage drops below an undervoltage threshold.

* * * * *